(12) United States Patent
Schliwa-Bertling et al.

(10) Patent No.: US 9,769,748 B2
(45) Date of Patent: Sep. 19, 2017

(54) MONITORING OF RADIO BLOCKS IN EXTENDED RADIO COVERAGE

(71) Applicant: TELEFONAKTIEBOLAGET L M ERICSSON (PUBL), Stockholm (SE)

(72) Inventors: Paul Schliwa-Bertling, Ljungsbro (SE); Mårten Sundberg, Årsta (SE); John Walter Diachina, Garner, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 26 days.

(21) Appl. No.: 14/749,001

(22) Filed: Jun. 24, 2015

(65) Prior Publication Data

US 2015/0382294 A1 Dec. 31, 2015

Related U.S. Application Data

(60) Provisional application No. 62/017,133, filed on Jun. 25, 2014.

(51) Int. Cl.
*H04W 52/02* (2009.01)
*H04W 84/04* (2009.01)

(52) U.S. Cl.
CPC ... *H04W 52/0209* (2013.01); *H04W 52/0229* (2013.01); *H04W 84/042* (2013.01); *Y02B 60/50* (2013.01)

(58) Field of Classification Search
CPC ......... H04W 52/0209; H04W 52/0229; H04W 84/042; Y02B 60/50
See application file for complete search history.

(56) References Cited

U.S. PATENT DOCUMENTS

| 6,081,907 A * | 6/2000 | Witty | H04L 12/1877 714/6.1 |
| 7,584,397 B2 * | 9/2009 | Terry | H04L 1/0003 714/748 |
| 2009/0245280 A1 * | 10/2009 | Rajamani | H04W 52/0235 370/468 |
| 2014/0078946 A1 * | 3/2014 | Salvekar | H04W 52/0229 370/311 |
| 2014/0098761 A1 * | 4/2014 | Lee | H04W 74/006 370/329 |

(Continued)

FOREIGN PATENT DOCUMENTS

EP 2 635 082 A1 9/2013
WO WO 2015/113214 A1 * 8/2015

OTHER PUBLICATIONS

3rd Generation Partnership Project; Technical Specification Group Radio Access Network; Evolved Universal Terrestrial Radio Access (E-UTRA); LTE coverage enhancements (Release 11). 3GPP TR 36.824 v11.0.0 (Jun. 2012), the whole document.

(Continued)

*Primary Examiner* — Mohammad Adhami
*Assistant Examiner* — Shailendra Kumar (57) ABSTRACT

A technique is described herein for saving power (e.g., battery power) at a receiving device (e.g., wireless device) by having a transmitting device (e.g., wireless access node) add an indicator to repeated radio blocks, where the indicator can be used by the receiving device (e.g., wireless device) to stop monitoring one or more of the repeated radio blocks.

18 Claims, 7 Drawing Sheets

(56) References Cited

U.S. PATENT DOCUMENTS

2015/0237644 A1* 8/2015 Golitschek Edler von Elbwart . H04W 72/12 370/329

OTHER PUBLICATIONS

Vodafone Group PLC: "New Study Item on Cellular System Support for Ultra Low Complexity and Low Throughput Internet of Things". 3GPP TSG-GERAN Meeting #62. GP-140421. Valencia, Spain, May 26-30, 2014, the whole document.

* cited by examiner

MONITORING OF RADIO BLOCKS IN EXTENDED RADIO COVERAGE

CLAIM OF PRIORITY

This application claims the benefit of priority to U.S. Provisional Application No. 62/017,133, filed on Jun. 25, 2014, the entire contents of which are hereby incorporated by reference for all purposes.

TECHNICAL FIELD

The present disclosure relates generally to radio transmission and reception of radio blocks between a receiving device and a transmitting device and, more particularly, to techniques for saving power at the receiving device by having the transmitting device add an indicator to repeated radio blocks, where the indicator can be used by the receiving device to stop the monitoring of one or more of the repeated radio blocks.

BACKGROUND

The following abbreviations and terms are herewith defined, at least some of which are referred to within the following description of the present disclosure.
3GPP 3rd-Generation Partnership Project
AGCH Access Grant Channel
ASIC Application Specific Integrated Circuit
BLER Block Error Rate
BSC Base Station Controller
BTS Base Transceiver Stations
CC Coverage Class
CN Core Network
CRC Cyclic Redundancy Check
DL Downlink
DSP Digital Signal Processor
EDGE Enhanced Data rates for GSM Evolution
EGPRS Enhanced General Packet Radio Service
eNB evolved Node B
E-UTRA Evolved Universal Terrestrial Radio Access
GSM Global System for Mobile Communications
GERAN GSM/EDGE Radio Access Network
GPRS General Packet Radio Service
HARQ Hybrid Automatic Repeat Request
LTE Long-Term Evolution
MAC Media Access Control
MME Mobile Management Entity
MT Mobile Terminal
MTC Machine Type Communications
PCH Paging Channel
PDN Packet Data Network
RAN Radio Access Network
RBS Radio Base Station
RLC Radio Link Control
RNC Radio Network Controller
SGSN Serving GPRS Support Node
UE User Equipment
UL Uplink
UMTS Universal Mobile Telecommunications System
WCDMA Wideband Code Division Multiple Access
WiMAX Worldwide Interoperability for Microwave Access
Receiving device: The wireless devices (e.g., users, mobile stations) described herein are configured to operate as a receiving device when receiving DL communications from a wireless access node (e.g., base station), which in this case would be configured to operate as a transmitting device.

The anticipated ubiquitous deployment of wireless devices used for what is known as Machine-Type-Communication (MTC) will result in wireless devices being placed outside the typical radio coverage of the existing radio networks, e.g., in basements and similar locations. One way to improve the radio coverage is by expanding the radio access network infrastructure, such as by adding additional Radio Base Station (RBS) equipment. This, however, may very quickly result in an unreasonable investment effort and may not be acceptable to operators.

An alternative approach to adding additional equipment is to keep the existing radio access network infrastructure unchanged but instead improve the radio coverage through novel radio transmission and reception techniques as well as new Radio Resource Management algorithms. The latter approach is currently being discussed in the wireless industry and is a subject for a standardization effort, for example, in the 3rd-Generation Partnership Project (3GPP) as described in the 3GPP TR 36.824 V11.0.0 Technical Report, entitled "Evolved Universal Terrestrial Radio Access (E-UTRA); LTE coverage enhancements" and the 3GPP TSG-GERAN Meeting #62 Work Item Description GP-140421, entitled "New Study Item on Cellular System Support for Ultra Low Complexity and Low Throughput Internet of Things." The contents of these two documents are hereby incorporated by reference for all purposes.

While there are many techniques that can be used to enhance the radio coverage, one technique is to enhance the radio coverage through the use of repeated transmissions. The repeated transmissions technique is currently being considered in the context of the related standardization work in 3GPP TSG RAN, as described in the above-referenced 3GPP TR 36.824 V11.0.0 Technical Report, entitled "Evolved Universal Terrestrial Radio Access (E-UTRA); LTE coverage enhancements" as well as in 3GPP TSG GERAN as described in the 3GPP TR 45.820 V1.3.0 Technical Report, entitled "Cellular System Support for Ultra Low Complexity and Low Throughput Internet of Things".

To explain a problem associated with the use of repeated transmissions, one should first realize that for a receiving device to understand if it is being paged, being assigned resources, receiving scheduled data in the downlink (DL), being sent a radio resource request, or receiving scheduled data in the uplink (UL), the receiving device needs to monitor the common DL channel (e.g., in the case of paging, resource assignment), the common UL channel (e.g., in the case of radio resource request), or the data bearing channel assigned to the receiving device (e.g., in the case of scheduled data). It is to be noted that each radio block being received and monitored by the receiving device will have a negative impact on the receiving device from a power consumption perspective.

In view of these realizations, one problem with the existing DL monitoring functionality and repeated transmissions is that the receiving device (e.g., a mobile station (MS)) currently monitors all of the DL radio blocks on the common channel (e.g., in the case of paging, resource assignment) or on the channel assigned for data transfer (e.g., in the case of DL scheduling) when expecting a radio block addressed to itself. For example, assume the receiving device is not in extended coverage and hence can decode any instance of a received radio block without any additional repetitions, where the received radio block in this case is actually one of multiple repetitions of the same radio block intended for a device in extended coverage. The receiving device will not know that the particular received radio block is part of a repetition period N (e.g., eight repetitions of a radio block) and is repeated N times (e.g., there are seven more repetitions of the radio block). Instead, the receiving device would expect that it might be addressed in the coming next radio blocks (e.g., seven more repeated radio blocks after the first received radio block) and will monitor all the repeated N radio blocks (e.g., eight repeated radio blocks) when, in actuality, the receiving device would only need to have monitored the first received repeated radio block. The receiving device, by monitoring all of the repeated N radio blocks, will have a negative impact from a power consumption perspective, and hence, it would be desirable to minimize the monitoring time of the receiving device. This need and other needs are addressed in the present disclosure.

SUMMARY

A receiving device, a transmitting device, and various methods for addressing at least the aforementioned need are described in the independent claims. Advantageous embodiments of the receiving device, the transmitting device, and the various methods are further described in the dependent claims.

In one aspect, the present disclosure provides a receiving device configured to communicate with a transmitting device. The receiving comprises a processor and a memory that stores processor-executable instructions, wherein the processor interfaces with the memory to execute the processor-executable instructions, whereby the receiving device is operable to perform a monitor operation, an attempt operation, a determine operation, and a stop monitoring operation. In the monitor operation, the receiving device is operable to monitor up to N radio blocks received from the transmitting device, wherein N is based on a coverage class of the receiving device. In the attempt operation, the receiving device is operable to attempt to decode an original radio block by combining the monitored radio blocks. In the determine operation, the receiving device is operable to determine if the original radio block is successfully decoded. In the stop monitoring operation, when the original radio block is determined to be successfully decoded then the receiving device is operable to stop monitoring a remainder of radio blocks in a repetition period, wherein the repetition period comprises a set of radio blocks each of which corresponds to the original radio block, and, wherein the repetition period is indicated by an indicator in each of the monitored radio blocks. The receiving device by implementing the monitor operation, the attempt operation, the determine operation, and the stop monitoring operation will have a positive impact from a power consumption perspective.

In another aspect, the present disclosure provides a method in a receiving device configured to communicate with a transmitting device. The method comprises a monitoring step, an attempting step, a determining step, and a stop monitoring step. In the monitoring step, up to N radio blocks received from the transmitting device are monitored, wherein N is based on a coverage class of the receiving device. In the attempting step, an original radio block is attempted to be decoded by combining the monitored radio blocks. In the determining step, it is determined if the original radio block is successfully decoded. In the stop monitoring step, when the original radio block is determined to be successfully decoded then monitoring a remainder of radio blocks in a repetition period is stopped, wherein the repetition period comprises a set of radio blocks each of which corresponds to the original radio block, and wherein the repetition period is indicated by an indicator in each of the monitored radio blocks. The receiving device by implementing the monitoring step, the attempting step, the determining step, and the stop monitoring step will have a positive impact from a power consumption perspective.

In yet another aspect, the present disclosure provides a transmitting device configured to communicate with a receiving device. The transmitting device comprises a processor and a memory that stores processor-executable instructions, wherein the processor interfaces with the memory to execute the processor-executable instructions, whereby the transmitting device is operable to perform a generate operation and a transmit operation. In the generate operation, the transmitting device is operable to generate one or more radio blocks to be transmitted during a repetition period, wherein the repetition period is based on a coverage class of the receiving device, and wherein the one or more radio blocks each includes an indicator that indicates the repetition period. In the transmit operation, the transmitting device is operable to transmit the one or more radio blocks to the receiving device during the repetition period. The transmitting device by implementing the generate operation and the transmit operation will have a positive impact on the power consumption at the receiving device.

In still yet another aspect, the present disclosure provides a method in a transmitting device configured to communicate with a receiving device. The method comprises a generating step and a transmitting step. In the generating step, one or more radio blocks are generated to be transmitted during a repetition period, wherein the repetition period is based on a coverage class of the receiving device, and wherein the one or more radio blocks each includes an indicator that indicates the repetition period. In the transmitting step, the one or more radio blocks are transmitted to the receiving device during the repetition period. The transmitting device by implementing the generate operation and the transmit operation will have a positive impact on the power consumption at the receiving device.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings.

DETAILED DESCRIPTION

Figure 1:
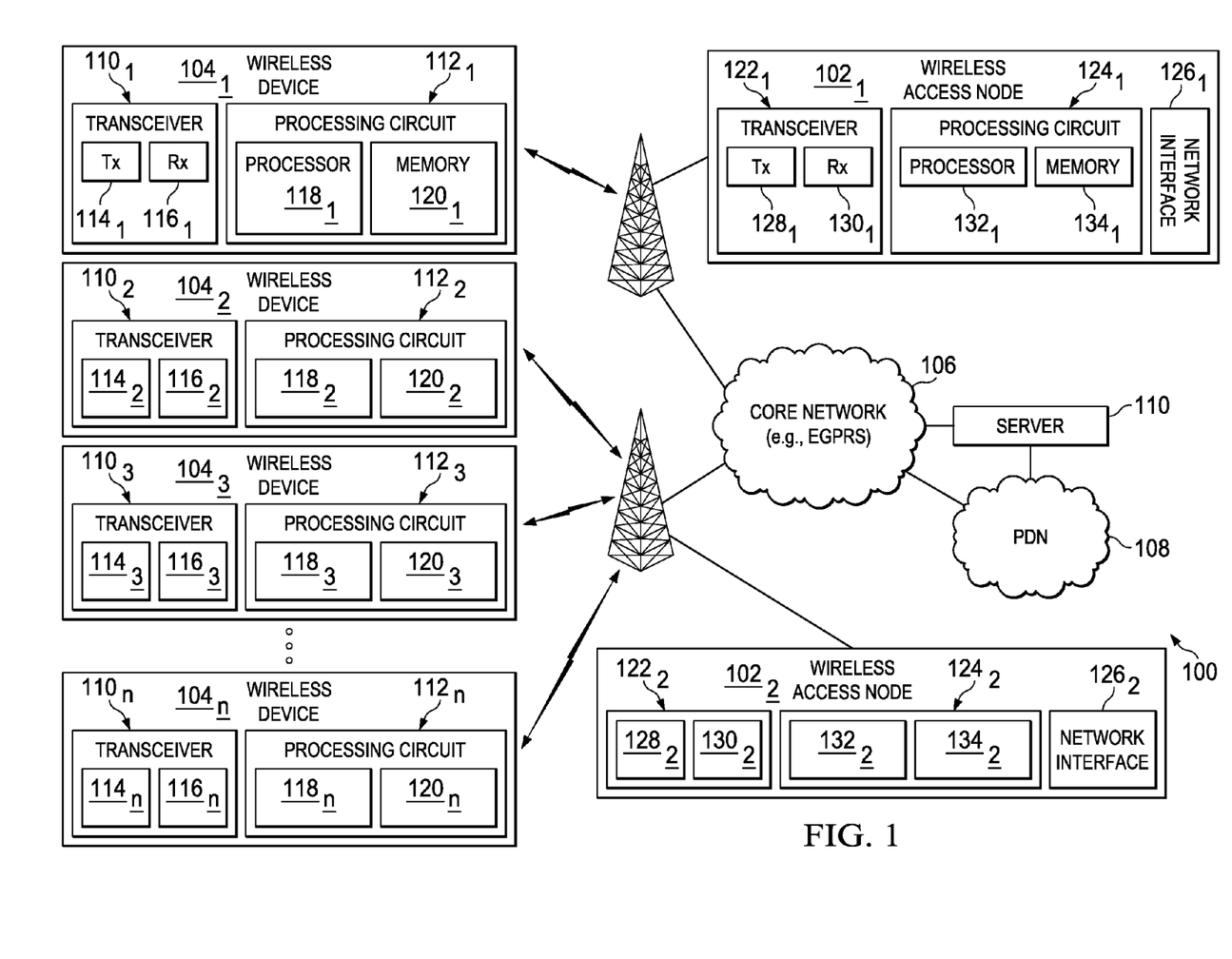
FIG. 1 is a diagram of an exemplary wireless communication network in accordance with an embodiment of the present disclosure.

To describe the technical features of the present disclosure, a discussion is provided first to describe an exemplary wireless communication network which includes multiple wireless devices (e.g., receiving devices) and multiple wireless access nodes (e.g., transmitting devices), each of which are configured in accordance with the present disclosure (see FIG. 1). Then, a discussion is provided to explain the technique and associated different embodiments that can be implemented by the wireless devices (e.g., receiving devices) and the wireless access nodes (e.g., transmitting devices) in accordance with the present disclosure (see FIGS. 2-9).

Exemplary Wireless Communication Network 100

Referring to FIG. 1, there is illustrated an exemplary wireless communication network 100 in accordance with the present disclosure. The wireless communication network 100 includes multiple wireless access nodes $102_1$ and $102_2$ (only two shown), multiple wireless devices $104_1$, $104_2$, $104_3$ and $104_n$, and a core network 106 (e.g., EGPRS core network 106). The wireless communication network 100 also includes many other well-known components, but for clarity, only the components needed to describe the features of the present disclosure are described herein. Further, the wireless communication network 100 is described herein as being an GSM/EGPRS wireless communication network 100 which is also known as an EDGE wireless communication network 100. However, those skilled in the art will readily appreciate that the techniques of the present disclosure which are applied to the GSM/EGPRS wireless communication network 100 are generally applicable to other types of wireless communication systems, including, for example, WCDMA, LTE, and WiMAX systems.

The wireless communication network 100 includes the wireless access nodes $102_1$ and $102_2$ (only two shown) which provide network access to the wireless devices $104_1$, $104_2$, $104_3$ . . . $104_n$. In this example, the wireless access node $102_1$ is providing network access to wireless device $104_1$ while the wireless access node $102_2$ is providing network access to wireless devices $104_2$, $104_3$ . . . $104_n$. The wireless access nodes $102_1$ and $102_2$ are connected to the core network 106 (e.g., EGPRS core network 106). The core network 106 is connected to an external PDN 108, such as the Internet, and a server 110 (only one shown). The wireless devices $104_1$, $104_2$, $104_3$ . . . $104_n$ may communicate with one or more servers 110 (only one shown) connected to the core network 106 or the packet data network 108.

The wireless devices $104_1$, $104_2$, $104_3$ . . . $104_n$ may refer generally to an end terminal (user) that attaches to the wireless communication network 100, and may refer to either a MTC device or a non-MTC device. Further, the term "wireless device" is generally intended to be synonymous with the term "User Equipment," or UE, as that term is used by the 3rd-Generation Partnership Project (3GPP), and includes standalone wireless devices, such as terminals, cell phones, smart phones, and wireless-equipped personal digital assistants, as well as wireless cards or modules that are designed for attachment to or insertion into another electronic device, such as a personal computer, electrical meter, etc.

Likewise, the wireless access nodes $102_1$ and $102_2$ may refer in general to a base station or central node in the wireless communication network 100, and may refer to wireless access nodes $102_1$ and $102_2$ that are controlled by a physically distinct radio network controller as well as to more autonomous access points, such as the so-called evolved Node Bs (eNBs or eNodeBs) in Long-Term Evolution (LTE) networks. Accordingly, the term "wireless access node" may also refer to Radio Network Controllers (RNCs) and Node Bs (NBs) in 3G, or Base Station Controllers (BSCs) or Base Transceiver Stations (BTSs) in 2G.

Each wireless device $104_1$, $104_2$, $104_3$ . . . $104_n$ may include a transceiver circuit $110_1$, $110_2$, $110_3$ . . . $110_n$ for communicating with the wireless access nodes $102_1$ and $102_2$, and a processing circuit $112_1$, $112_2$, $112_3$ . . . $112_n$ for processing signals transmitted from and received by the transceiver circuit $110_1$, $110_2$, $110_3$ . . . $110_n$ and for controlling the operation of the corresponding wireless device $104_1$, $104_2$, $104_3$ . . . $104_n$. The transceiver circuit $110_1$, $110_2$, $110_3$ . . . $110_n$ may include a transmitter $114_1$, $114_2$, $114_3$ . . . $114_n$ and a receiver $116_1$, $116_2$, $116_3$ . . . $116_n$, which may operate according to any standard, e.g., the GSM/EDGE standard. The processing circuit $112_1$, $112_2$, $112_3$ . . . $112_n$ may include a processor $118_1$, $118_2$, $118_3$ . . . $118_n$ and a memory $120_1$, $120_2$, $120_3$ . . . $120_n$ for storing program code for controlling the operation of the corresponding wireless device $104_1$, $104_2$, $104_3$ . . . $104_n$. The program code may include code for performing the procedures (e.g., indicating information about blocks of multiple repetitions, monitoring blocks, decoding blocks, determining if all blocks of multiple repetitions have been monitored, accumulating blocks, and repeating transmissions) as described hereinafter.

Each wireless access node $102_1$ and $102_2$ may include a transceiver circuit $122_1$ and $122_2$ for communicating with wireless devices $104_1$, $104_2$, $104_3$ . . . $104_n$, a processing circuit $124_1$ and $124_2$ for processing signals transmitted from and received by the transceiver circuit $122_1$ and $122_2$ and for controlling the operation of the corresponding wireless access node $102_1$ and $102_2$, and a network interface $126_1$ and $126_2$ for communicating with the core network 106 (e.g., via core network nodes such as Serving GPRS Support Nodes (SGSNs) in GPRS or Mobility Management Entity (MMEs) in LTE). The transceiver circuit $122_1$ and $122_2$ may include a transmitter $128_1$ and $128_2$ and a receiver $130_1$ and $130_2$, which may operate according to any standard, e.g., the GSM/EDGE standard. The processing circuit $124_1$ and $124_2$ may include a processor $132_1$ and $132_2$ and a memory $134_1$ and $134_2$ for storing program code for controlling the operation of the corresponding wireless access node $102_1$ and $102_2$. The program code may include code for performing the procedures (e.g., indicating information about blocks of multiple repetitions, monitoring blocks, decoding blocks, determining if all blocks of multiple repetitions have been monitored, accumulating blocks, and repeating transmissions) as described hereinafter.

Basic Techniques and Different Embodiments of Present Disclosure

In the wireless communication network 100 (cellular system 100) using extended coverage, one method to increase the radio coverage is to repeat the original radio blocks requiring transmission. The number of repetitions would be known to the receiving device and hence, would allow the receiving device to coherently combine the separate repeated transmissions to achieve improved reception of the radio blocks transmitted. In the discussion below, DL communications are described where the wireless devices $104_1$, $104_2$, $104_3$ and $104_n$ are considered the receiving devices and the wireless access node $102_1$ and $102_2$ are considered the transmitting devices.

If the wireless devices $104_2$, $104_3$ ... $104_n$ (for example) are in different coverage classes and on the same physical resources, then the monitoring time of the corresponding DL channels that is needed for the wireless devices $104_2$, $104_3$ ... $104_n$ to be able to decode radio blocks sent thereon will be different depending on particular coverage classes of the particular wireless devices $104_2$, $104_3$ ... $104_n$. An example of this feature is discussed next with respect to FIG. 2 where wireless devices $104_2$, $104_3$, $104_4$ and $104_5$ (i.e., MS1, MS2, MS3 and MS4) have different coverage classes and different monitoring times to decode the repeated DL radio blocks.

Figure 2:
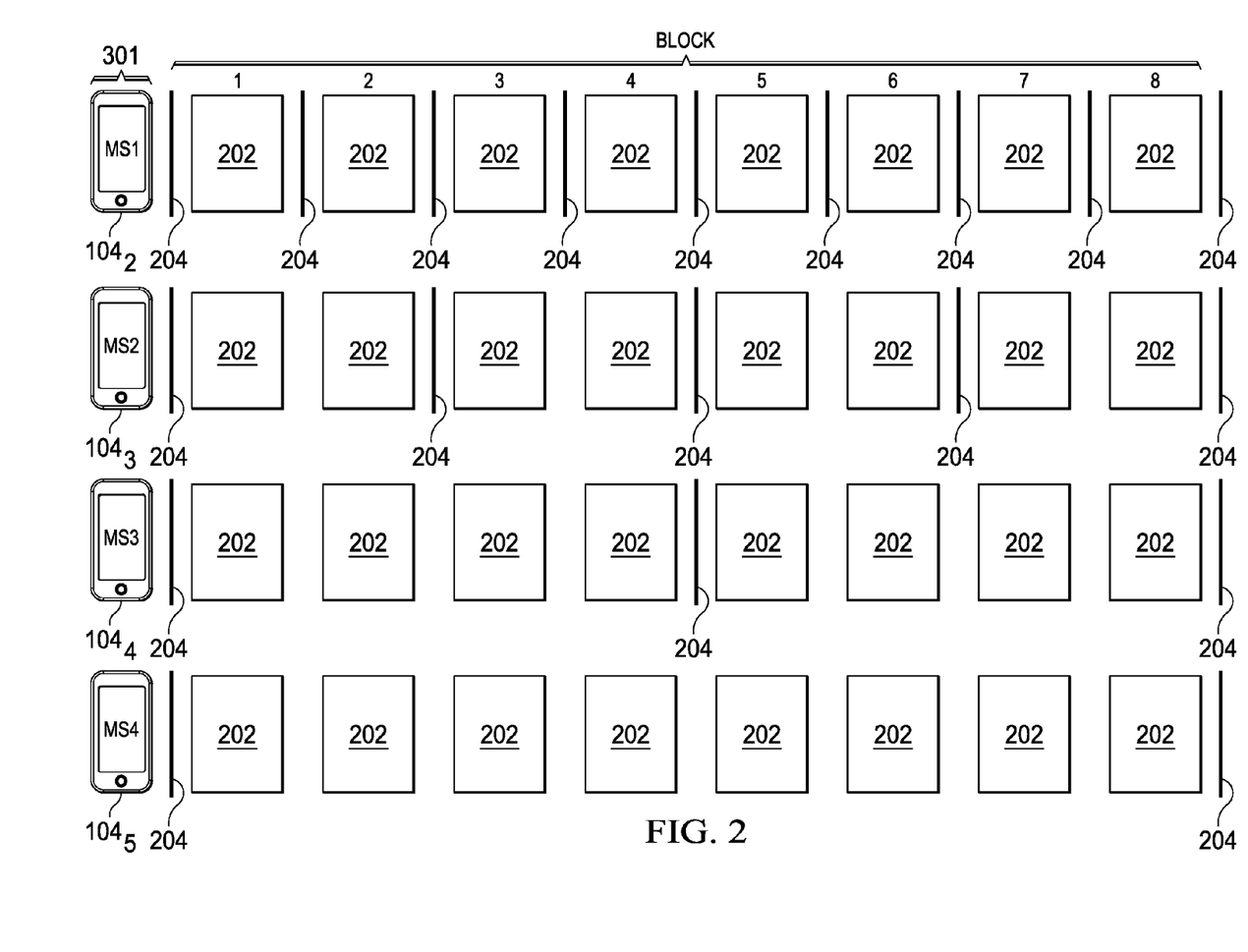
FIG. 2 is an illustration where a Paging Channel (PCH) having repeated radio blocks is being monitored by multiple receiving devices, each of which is in a different coverage class.

Referring to FIG. 2, there is an illustration where the Paging Channel (PCH) having repeated radio blocks 202 is being monitored by multiple receiving devices MS1, MS2, MS3 and MS4 each of which are in a different coverage class. In this example, the first row applies to MS1 which has a coverage class of one. The second row applies to MS2 which has a coverage class of two. The third row applies to MS3 which has a coverage class of four. The fourth row applies to MS4 which has a coverage class of eight. The vertical black bars 204 illustrate the points in time that the respective MS can decode the received radio block(s) 202. That is, this illustration indicates that MS1 needs a single repetition and is therefore able to decode the original radio block 202 after receiving any repeated individual radio block 202. The MS2 needs two repetitions and is therefore able to decode the original radio block 202 after receiving two repeated radio blocks 202. The MS3 needs four repetitions and is therefore able to decode the original radio block 202 after receiving four repeated radio blocks 202. The MS4 needs eight repetitions and is therefore able to decode the original radio block 202 after receiving eight repeated radio blocks 202. As such, FIG. 2 represents the case where no indicators are provided by the repeated radio blocks 202 but where a fixed frame structure is still used so that a device that makes use of a coverage class requiring N repeated radio blocks will still know where the first of these N repeated radio blocks can occur (i.e. in the first radio block within the set of radio blocks delineated by the vertical black lines) and therefore where all remaining N–1 repetitions can occur.

The MS1 after receiving and decoding the first radio block 202 (block 1) would in the past also receive and decode the remaining seven repeated radio blocks 202 (blocks 2-8) but in the present disclosure the MS1 is configured to receive and decode the first radio block 202 (block 1) and then stop monitoring the remaining seven repeated radio blocks 202 (blocks 2-8). Likewise, the MS2 is configured in the present disclosure to receive and decode the two repeated radio blocks 202 (blocks 1-2) and then stop monitoring the remaining six repeated radio blocks 202 (blocks 3-8). The MS3 is configured in the present disclosure to receive and decode the four repeated radio blocks 202 (blocks 1-4) and then stop monitoring the remaining four repeated radio blocks 202 (blocks 5-8). The MS4 is configured in the present disclosure to receive and decode the eight repeated radio blocks 202 (blocks 1-8). A discussion is provided next to explain in detail how the MS1, MS2, MS3 and MS4 or any receiving device 301 can operate in accordance with different embodiments of the present disclosure.

The present disclosure provides a new mechanism for improving power savings (e.g., in the battery lifetime) of the receiving devices 301 (e.g., MS1, MS2, M3, M4, wireless devices $104_2$, $104_3$ ... $104_n$) when monitoring a DL channel that is dimensioned for extended coverage by having repeated DL radio blocks. To accomplish this, it is proposed that the transmitting device 801 (e.g., wireless access node $102_2$) explicitly include one type of indicator in the transmitted DL radio blocks (e.g., for paging, resource assignment, or scheduling data) indicating that the radio block is one of multiple repetitions (e.g., one of N repetitions) or implicitly or explicitly provide another type of indicator indicating the number of repetitions remaining in the current repetition period (e.g., Y of N repetitions remaining). The later indicator (e.g., Y of N repetitions remaining) may be provided implicitly (via a fixed frame structure) or explicitly in the same transmitted DL radio blocks as the former indicator (e.g., one of N repetitions) (via a non-fixed frame structure) to the receiving devices (e.g., MS1, MS2, MS3, MS4, wireless devices $104_2$, $104_3$ ... $104_n$) as described hereinafter. The indicators may be used by the receiving devices (e.g., MS1, MS2, MS3, MS4, wireless devices $104_2$, $104_3$ ... $104_n$) as discussed next with respect to FIGS. 3-6 to minimize the monitoring time and thereby provide power savings (i.e., battery power savings).

Figure 3:
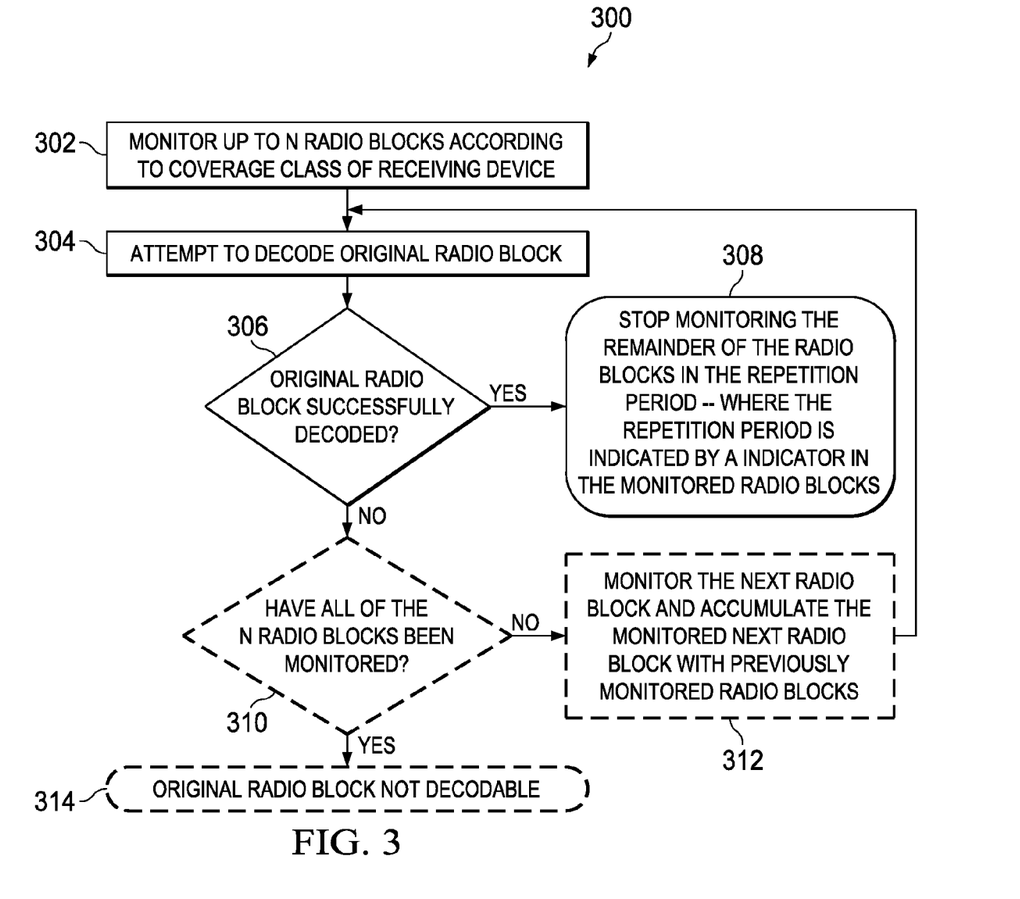
FIG. 3 is a flowchart of a method implemented in a receiving device (e.g., MS1, MS2, MS3, MS4, wireless devices) in accordance with an embodiment of the present disclosure.

Referring to FIG. 3, there is a flowchart of a method 300 implemented in a receiving device 301 (e.g., MS1, MS2, MS3, MS4, wireless devices $104_1$, $104_2$, $104_3$ ... $104_n$) in accordance with an embodiment of the present disclosure. At step 302, the receiving device 301 monitors up to N radio blocks 402, 502, 602a, 602b, 602c and 602d received from the transmitting device 801 (e.g., wireless access nodes $102_1$ and $102_2$), wherein N is based on a coverage class (e.g., estimated coverage class) of the receiving device 301. At step 304, the receiving device 301 attempts to decode an original radio block 402, 502, 602a, 602b, 602c and 602d by combining the monitored radio blocks 402, 502, 602a, 602b, 602c and 602d. At step 306, the receiving device 301 determines if the original radio block 402, 502, 602a, 602b, 602c and 602d is successfully decoded. In the case where the original radio block 402, 502, 602a, 602b, 602c and 602d is determined to be successfully decoded, the receiving device 301 at step 308 stops monitoring a remainder of the radio blocks 402, 502, 602a, 602b, 602c and 602d in a repetition period, wherein the repetition period comprises a set of radio blocks 402, 502, 602a, 602b, 602c and 602d where each radio block corresponds to the original radio block, and wherein the repetition period is indicated by an indicator 404, 504, 604a, 604b, 604c and 604d in each of the monitored radio blocks 402, 502, 602a, 602b, 602c and 602d. In the case where the original radio block 402, 502, 602a, 602b, 602c and 602d is determined to be not successfully decoded, the receiving device 301 at step 310 determines if all of the N radio blocks 402, 502, 602a, 602b, 602c and 602d have been monitored. In the case where all of the N radio blocks 402, 502, 602a, 602b, 602c and 602d have not been determined to be monitored, the receiving device 301 at step 312 monitors a next radio block 402, 502, 602a, 602b, 602c and 602d received from the transmitting device 801, accumulates the monitored next radio block 402, 502, 602a, 602b, 602c and 602d with the previously monitored radio blocks 402, 502, 602a, 602b, 602c and 602d, and returns to step 304. In the case where all of the N radio blocks 402 have been determined to be monitored, the receiving device 301 at step 314 determines that the original radio block 402, 502, 602a, 602b, 602c and 602d is not decodable. There are three examples of implementing the method 300 using different types of indicators 404, 504, 604a, 604b, 604c and 604d which may be provided implicitly (fixed frame structure) or explicitly (non-fixed frame structure) in the radio blocks 402, 502, 602a, 602b, 602c and 602d transmitted to the receiving device 301 which are described next with respect to FIGS. 4-6.

Figure 4:
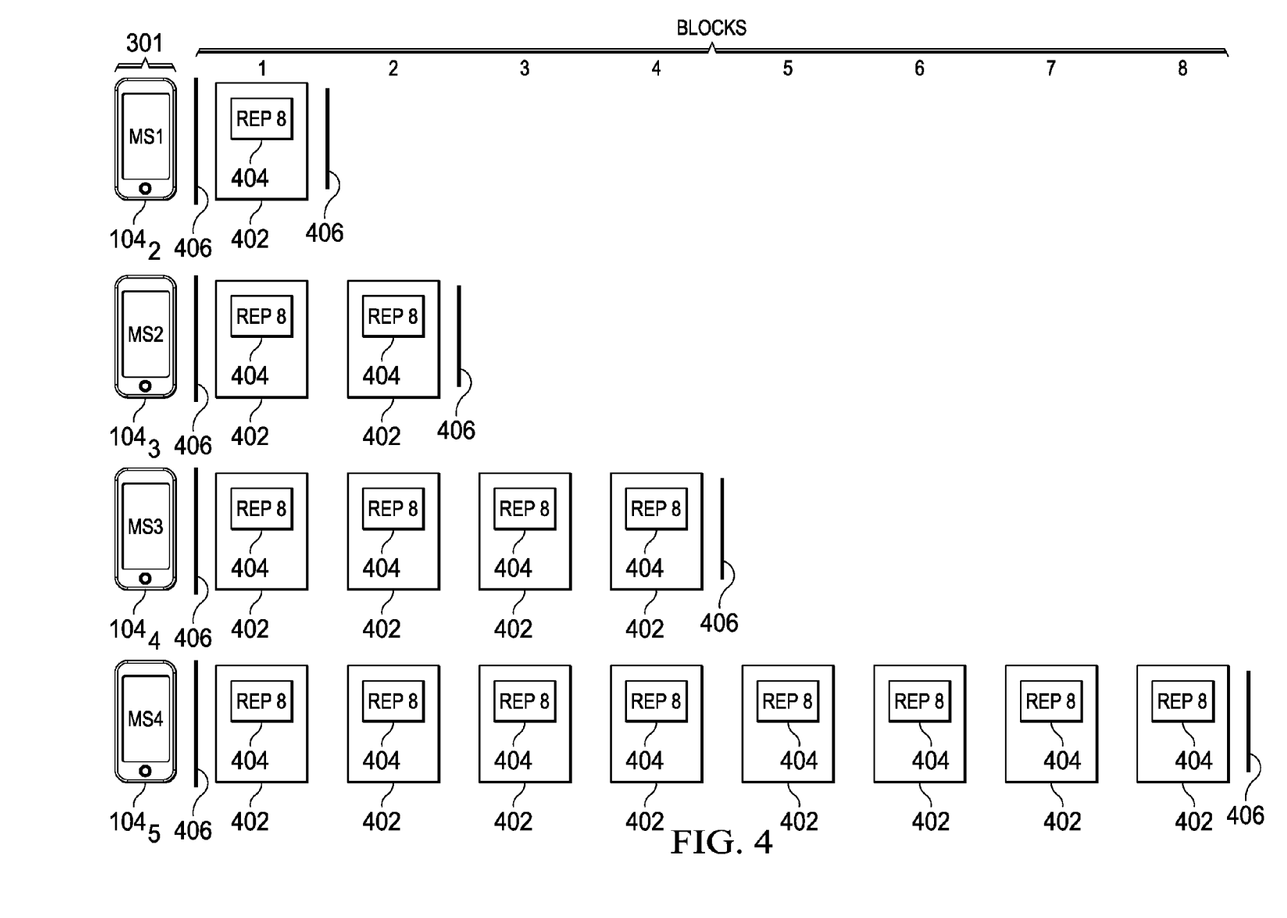
FIG. 4 is an illustration where the PCH has repeated radio blocks which have a fixed frame structure and an indicator being monitored by receiving devices (e.g., MS1, MS2, MS3 and MS4), each in a different coverage class in accordance with an embodiment of the present disclosure.

Referring to FIG. 4, there is an illustration where the PCH has repeated radio blocks 402 (blocks 1, 2 . . . 8) with a fixed frame structure and an indicator 404 (e.g., 8 repetitions) that are being monitored by receiving devices 301 (MS1, MS2, MS3 and MS4) each in a different coverage class in accordance with an embodiment of the present disclosure. In this example, the first row applies to MS1 which has a coverage class of one. The second row applies to MS2 which has a coverage class of two. The third row applies to MS3 which has a coverage class of four. The fourth row applies to MS4 which has a coverage class of eight. The vertical black bars 406 illustrate the points in time that the respective MS can decode the received radio blocks 402. That is, this illustration indicates that MS1 needs a single repetition and is therefore able to successfully decode the original radio block 402 after receiving one repeated radio block 402 (block 1). The MS2 needs two repetitions and is therefore able to successfully decode the original radio block 402 after receiving two repeated radio blocks 402 (blocks 1 and 2). The MS3 needs four repetitions and is therefore able to successfully decode the original radio block 402 after receiving four repeated radio blocks 402 (blocks 1-4). The MS4 needs eight repetitions and is therefore able to successfully decode the original radio block 402 after receiving eight repeated radio blocks 402 (blocks 1-8). It is to be noted that the number of coverage classes and the number of repetitions for the coverage classes illustrated in FIG. 4 (i.e., a single repetition of block for the first coverage class, two repetitions of blocks for the second coverage class, etc.) are provided as examples. In other embodiments, there may be fewer or more coverage classes and/or different numbers of repetitions may be associated with the different coverage classes.

In this example, each transmitted DL radio block 1, 2 . . . 8 (sent within the context of a fixed frame structure wherein DL radio block 1 is sent using frame number 1, DL radio block 2 is sent using frame number 2 etc. . . . ) is associated with an MS needing eight repetitions and where MS1-MS4 are all assumed to be in sync with regards to the fixed frame structure as of reading radio block 1. Thus, in this example, the radio blocks 1, 2 . . . 8 are intended for MS4 not MS1-MS3. All eight radio blocks 1, 2 . . . 8 include an indicator 404 indicating that radio blocks 1, 2 . . . 8 are sent using eight repetitions. In the remainder of this disclosure, the term "number of repetitions" and the term "coverage class" are interchangeably used to describe this indicator 404. These terms may be viewed as being effectively equivalent indicators 404 for the purpose of the disclosed techniques, because coverage classes map to respective numbers of repetitions. That is, for an MS receiving any given radio block 1, 2 . . . 8 of the eight repetitions, this indicator 404 will indicate to that MS the total number of times the radio block is being repeated (e.g., 8 repetitions). Each MS that belongs to a coverage class wherein less than eight repetitions of the original radio block are needed (e.g., MS1, MS2, and MS3 of FIG. 4) will be able to decode the original radio block 402 before all eight repetitions have been transmitted and will therefore understand from the indicator 404 therein that the original radio block 402 is not intended for that MS and the MS can thereby determine that it can stop monitoring the remaining repetitions of the radio block. In this example, MS2 monitors radio blocks 1 and 2 and sees these blocks are associated for a MS which needs eight repetitions and will not monitor radio blocks 3-8 but will monitor radio blocks 9-10 (not shown) to see if radio blocks 9-10 have an indicator 404 identifying two repetitions. Further, an MS that belongs to a coverage class needing eight repetitions but is not the intended recipient (e.g., MS4 is the intended recipient) will potentially be able to decode the original radio block before the end of the repetition period (i.e., before receiving all eight repetitions) and will therefore be able to stop monitoring that channel for the remainder of the repetition period, providing a power savings.

Hence, implementing the disclosed technique (method 300) and comparing, for each MS1, MS2, MS3 and MS4, their respective energy consumption in FIG. 2 (no indicator case) to FIG. 4 (indicator case), in which the intended MS (i.e., MS4) needs eight repetitions of radio blocks 202 and 402, results in the following power savings ratios considering the full repetition period:

MS1: 1/8 (7/8 reduction in power)
MS2: 1/4 (3/4 reduction in power)
MS3: 1/2 (1/2 reduction in power)
MS4: No change To summarize, the aforementioned embodiment, within each radio block 402, a DL indicator 404 is provided to the receiving devices 301 (e.g., MS1, MS2, MS3, MS4) indicating the number of repetitions/the coverage class (e.g., 8 repetitions) of devices (e.g., MS4) targeted with the repeated radio blocks 402. For the receiving devices 301 (e.g., MS1, MS2 and MS3) not belonging to the indicated coverage class, those receiving devices 301 may go back to sleep for the remainder of the repetition period corresponding to the coverage class indicated. That is, assuming that the receiving device 301 knows its coverage class (i.e., the number of repetitions expected for the DL channels the receiving device 301 is monitoring), then the receiving device 301 will know whether or not all repetitions of the blocks 402 should be received or not.

Figure 5:
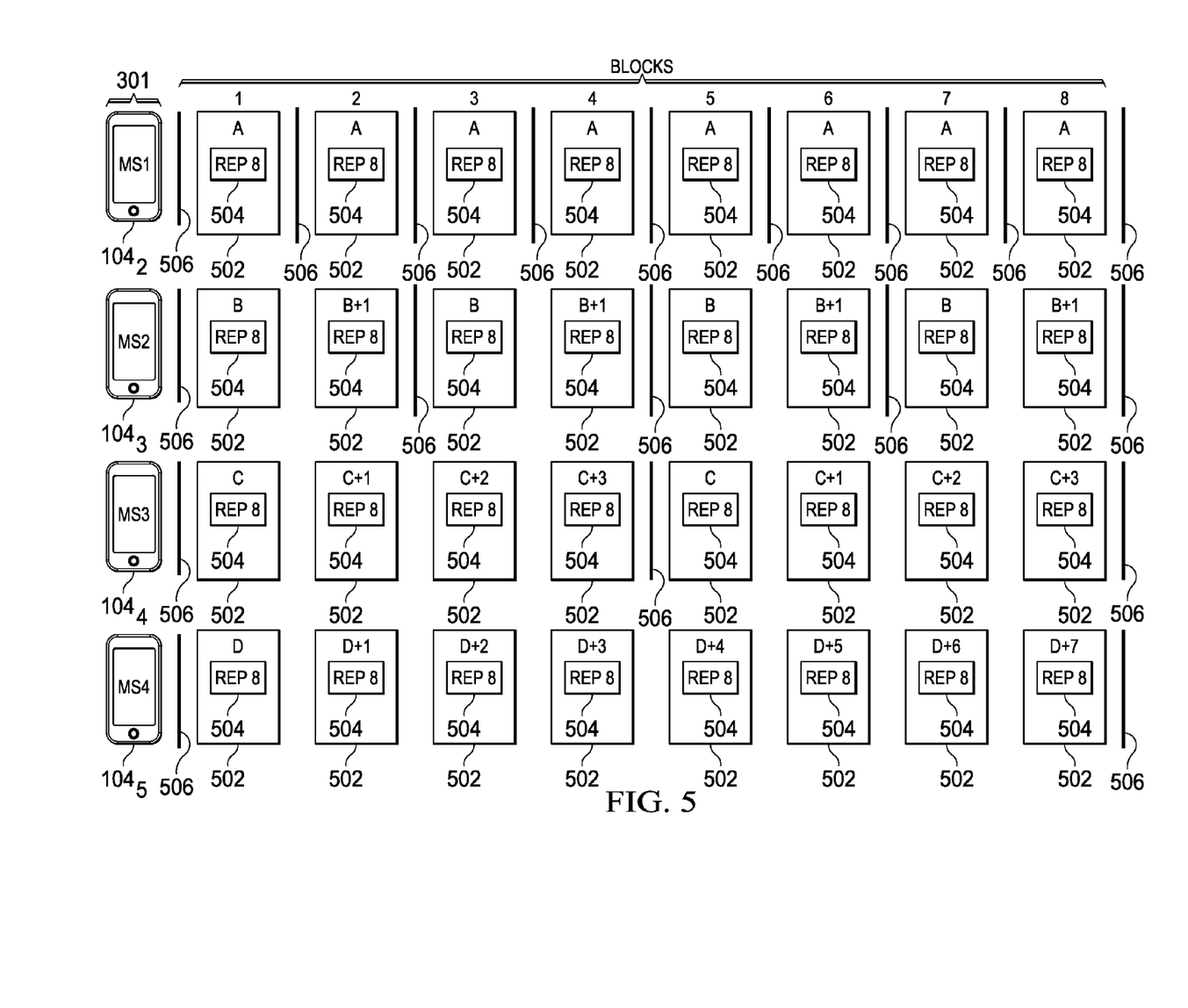
FIG. 5 is an illustration where the PCH has repeated radio blocks which have a fixed frame structure and an indicator being monitored by receiving devices (e.g., MS1, MS2, MS3 and MS4), each in a different coverage class in accordance with another embodiment of the present disclosure.

Referring to FIG. 5, there is an illustration where the PCH has repeated radio blocks 502 (blocks 1, 2 . . . 8) with a fixed frame structure and an indicator 504 (e.g., 8 repetitions) that are being monitored by receiving devices 301 (MS1, MS2, MS3 and MS4) each in a different coverage class in accordance with another embodiment of the present disclosure. In this example, the first row applies to MS1 which has a coverage class of one. The second row applies to MS2 which has a coverage class of two. The third row applies to MS3 which has a coverage class of four. The fourth row applies to MS4 which has a coverage class of eight. The vertical black bars 506 illustrate the points in time that the respective MS can decode the received radio blocks 502. That is, this illustration indicates that MS1 needs a single repetition and is therefore able to successfully decode the original radio block 502 after receiving one repeated radio block 502 (block 1). The MS2 needs two repetitions and is therefore able to successfully decode the original radio block 502 after receiving two repeated radio blocks 502 (blocks 1 and 2). The MS3 needs four repetitions and is therefore able to successfully decode the original radio block 502 after receiving four repeated radio blocks 502 (blocks 1-4). The MS4 needs eight repetitions and is therefore able to successfully decode the original radio block 502 after receiving eight repeated radio blocks 502 (blocks 1-8). It is to be noted that the number of coverage classes and the number of repetitions for the coverage classes illustrated in FIG. 5 (i.e., a single repetition of block for the first coverage class, two repetitions of blocks for the second coverage class, etc.) are provided as examples. In other embodiments, there may be fewer or more coverage classes and/or different numbers of repetitions may be associated with the different coverage classes.

In this example, the frame structure on which the DL indicator 504 is provided is based on a fixed frame structure where in this embodiment the radio blocks 502 using N repetitions may only be allowed to start on frame number (N*M)+1, where M is an integer ≥0 (i.e., the fixed frame structure in this embodiment is based on a predetermined rule for determining where the first block 502 of a given set of repeated blocks 502 will be sent by the transmitting device $102_2$), in which case, the DL indicator 504 (e.g., 8 repetitions) may be identical in all repeated radio blocks 502, allowing for a full coherent combination (whereby the original radio block 502 is successfully decoded) at the receiving device 301 thus, maximizing the received wanted signal energy. In other words, with this fixed frame structure, each receiving device 301 will know the radio block 502 in which the first of N repetitions (but not the N itself which it needs to determine after the full coherent combination) will occur (where N is determined by the coverage class) and therefore, the DL indicator 504 only needs to convey the value for N (e.g., 8 repetitions) and need not convey which specific instance of repetition (e.g., 1/8 repetitions) any given radio block represents. For example, as shown in FIG. 5, receiving devices 301 (e.g., MS1, MS2, MS3, MS4) of different coverage classes will look for the first of the set of N radio blocks 502 expected for their respective coverage class using pre-defined rules as follows:

MS1 has a coverage class requiring a single radio block transmission (repetition) and can therefore expect such transmissions to occur in any radio block position designated as "A" and upon coherent monitoring of block 1 (for example MS1 is assumed to be synchronized regarding the fixed frame structure as of receiving radio block 1) will further inspect the contents of the decoded radio block 502 to see indicator 504 (8 repetitions) and realize radio block 1 and radio blocks 2-8 are not intended for it so MS1 will not monitor radio blocks 2-8.

MS2 has a coverage class requiring two radio block transmissions and can therefore expect the first transmission to occur in any block position designated as "B" and the second transmission to occur in block position "B+1" and upon coherent monitoring of blocks 1-2 (MS2 is assumed to be synchronized regarding the fixed frame structure as of receiving block 1) will further inspect the contents of the resulting decoded block to see indicator 504 (8 repetitions) and realize blocks 3-4 and blocks 5-8 are not intended for it so MS2 will not monitor blocks 3-8. Note: that when a MS becomes synchronized regarding the fixed frame structure it will have knowledge of where any given radio block occurs within the context of the set of repetitions required for any coverage class. In other words, even though a MS determines that a specific downlink coverage class is applicable to itself, the fixed frame structure allows it to know where the first of N repetitions of the original radio block 502 will occur for all coverage classes but must read the indicator 504 to determine what the transmitting device 801 has actually sent using that transmission opportunity.

MS3 has a coverage class requiring four radio block transmissions and can therefore expect the first transmission to occur in any radio block position designated as "C" and the second, third and fourth transmissions to occur in block positions "C+1", "C+2" and "C+3" respectively. Then, MS3 upon coherent monitoring of blocks 1-4 (MS3 is assumed to be synchronized regarding the fixed frame structure as of receiving block 1) will further inspect the contents of the resulting decoded radio block to see indicator 504 (8 repetitions) and realize blocks 5-8 are not intended for it so MS3 will not monitor blocks 5-8.

MS4 has a coverage class requiring eight block transmissions and can therefore expect the first transmission to occur in any block position designated as "D" and the second, third, fourth . . . eighth transmissions to occur in block positions "D+1", "D+2", "D+3" . . . "D+7" respectively. Then, MS4 upon coherent monitoring of blocks 1-8 (MS4 is assumed to be synchronized regarding the fixed frame structure as of receiving block 1) will further inspect contents of the resulting decoded radio block to see indicator 504 (8 repetitions) and realize blocks 1-8 are intended for a MS having the same coverage class and then will determine if the decoded radio block is actually intended for it or some other MS with the same coverage class.

Figure 6:
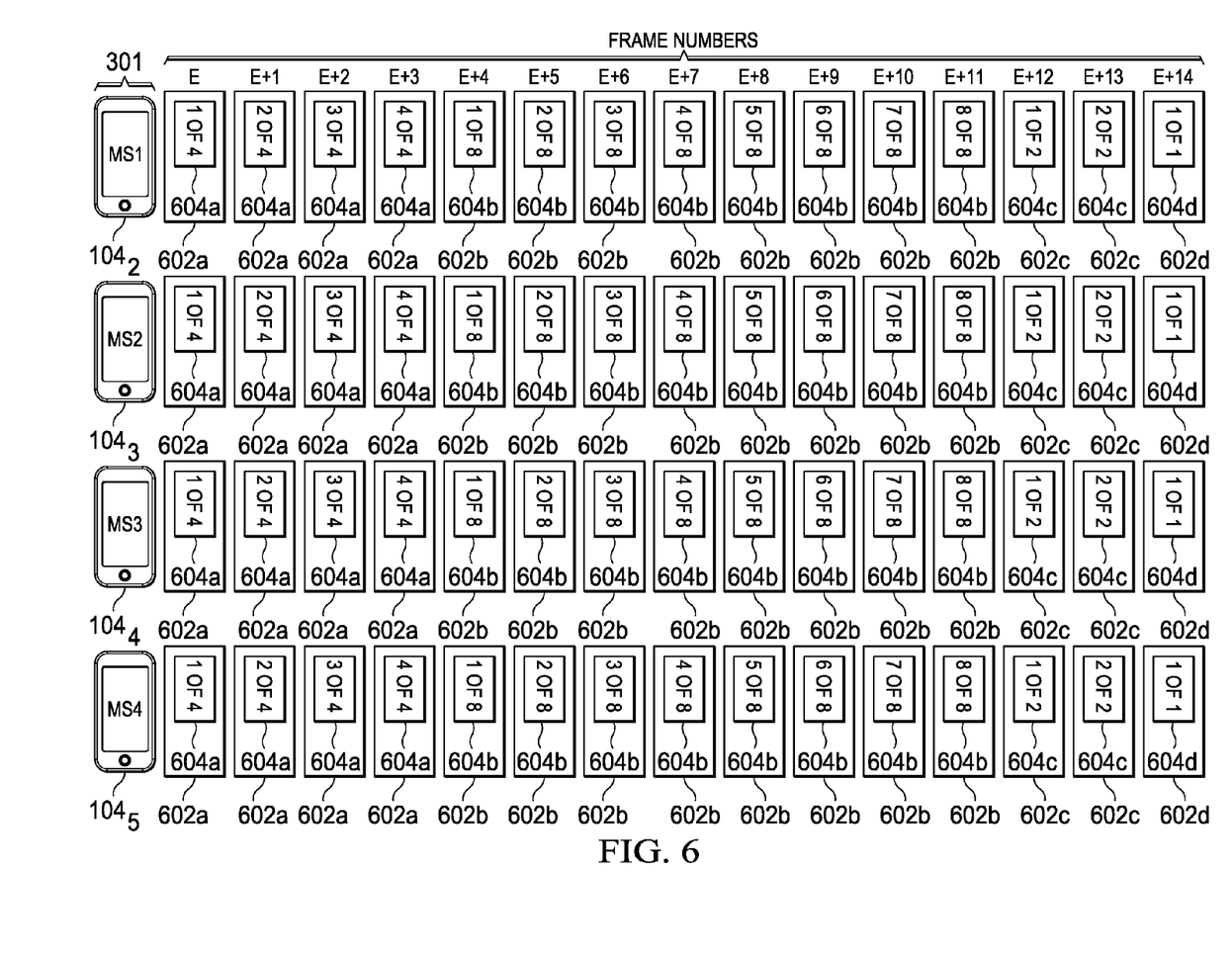
FIG. 6 is an illustration where the PCH has multiple sets of different radio blocks which have a non-fixed frame structure and indicators being monitored by receiving devices (e.g., MS1, MS2, MS3 and MS4), each in a different coverage class in accordance with another embodiment of the present disclosure.

Referring to FIG. 6, there is an illustration where the PCH having multiple sets of different radio blocks 602a (blocks 1, 2 . . . 4), 602b (blocks 1, 2 . . . 8), 602c (blocks 1 and 2) and 602d (block 1) which has a non-fixed frame structure and indicators 604a (e.g., 1/4, 2/4 . . . 4/4 repetitions), 604b (e.g., 1/8, 2/8 . . . 8/8 repetitions), 604c (e.g., 1/2, 2/2 repetitions) and 604d (e.g., 1/1 repetition) that are being monitored by receiving devices 301 (MS1, MS2, MS3 and MS4) each in a different coverage class in accordance with another embodiment of the present disclosure. In this example, the first row applies to MS1 which has a coverage class of one. The second row applies to MS2 which has a coverage class of two. The third row applies to MS3 which has a coverage class of four. The fourth row applies to MS4 which has a coverage class of eight. It is to be noted that the number of coverage classes and the number of repetitions for the coverage classes illustrated in FIG. 6 (i.e., a single repetition of block for the first coverage class, two repetitions of blocks for the second coverage class, etc.) are provided as examples. In other embodiments, there may be fewer or more coverage classes and/or different numbers of repetitions may be associated with the different coverage classes.

In this example, the DL indicators 604a, 604b, 604c and 604d are not provided within the context of a fixed frame structure, and hence, the DL indicators 604a, 604b, 604c and 604d included within each set of radio blocks 602a, 602b, 602c contain instead of a fixed reference (e.g., 8 repetitions) supplemented by a reference to where the currently received radio block is received in the repetition period (e.g., 1/8 repetitions). For example, if a block 602b is repeated eight times and the first transmission of the block 602b is starting in frame number E+4 as shown in FIG. 6 (used to transmit the first radio block), then the DL indicator 604b included therein would indicate '1/8', in frame number E+5, the DL indicator 604b would indicate '2/8' in the second block 602b, in frame number E+6, the DL indicator 604b would indicate '3/8' in the third block 602b etc. . . . . . The advantage of this approach compared to the approach described in the embodiment with respect to FIG. 5 is that there is full flexibility in when to start the transmission irrespective of the number of repetitions used (i.e., there is no pre-determined set of rules determining where the first block of a given repetition set must be sent). The disadvantage of this approach is that any MS needing extended coverage will not be able to fully coherently combine the information relating to the repetition number used because the blocks are not exactly the same due to the Y/N repetition indicators 604a, 604b, 604c and 604d (i.e., the repeated blocks are not the same because they each have a different Y/N repetition indicator). For example, the MS2 needs two repetitions to decode the block and starts to monitor a DL channel being used to transmit eight repetitions of a block 602b addressed to MS4. In this case, the two blocks 602b monitored by MS4 have indicators 604b indicating the block sequence '1/8' and '2/8'. Even though the information in the rest of these two monitored blocks 602b is identical (i.e. the information other than the indicator 604b of instance is identical), the indicator 604b of the instance of repetition (i.e., Y/8) in each block 602b will not be identical and hence there will be some reduction in the reliability (probability) with which MS4 successfully decodes the original radio block using coherent detection. This, in effect, may lead to the result that only MSs not needing repetitions such as MS1 can decode the block indicator 604b of block 602b with sufficient reliability, and use the information to not monitor the remaining blocks 602b and hence save battery life. However, if a MS experiences an acceptable performance reduction regarding its ability to reliably decode the blocks this embodiment may still be functional as discussed next where the MSs of different coverage classes can look for the first of the set of N repeated blocks expected for their respective coverage class as follows:

MS1 is in a coverage class requiring a single block transmission and can expect such transmissions to occur in any block (e.g., block 602d) that that has an indicator (e.g., indicator 604d) that indicates 1 of 1 transmission. In this example, MS1 (requiring 1 repetition) may sync up and start to monitor block 604c with frame number E+12 and after decoding this block to recover the original block realize this block is for a MS2 (requiring 2 repetitions) and therefore not monitor block 604c with frame number E+13. Then, MS1 will monitor block 604d with frame number E+14 and after decoding it to recover the original block will realize this block 604d is for a MS with coverage class 1 and further examine the decoded original block to see if the block 604d is the intended for it or for some other MS with coverage class 1.

MS2 in a coverage class requiring two block repeated transmissions and can expect the first transmission to occur in any block position that indicates 1 of 2 transmissions (e.g. block E+12 in FIG. 6). In this example, MS2 (requiring 2 repetitions) may sync up and start to monitor blocks 604a with frame numbers E and E+1 and after decoding them to recover the original block realize these two blocks are for a MS3 (requiring 4 repetitions) and therefore not monitor blocks 604a with frame numbers E+2 and E+3. Then, MS2 will monitor blocks 604b with frame numbers E+4 and E+5 and after decoding them to recover the original block realize these two blocks are for a MS4 (requiring 8 repetitions) and therefore will not monitor the remaining repeated blocks 604b which have frame numbers E+6 through E+11. Then, MS2 will start to monitor blocks 604c with frame numbers E+12 and E+13 and after decoding them to recover the original block will realize these two blocks 604c are for a MS with coverage class 2 and further examine the decoded original block to see if the two blocks 604c are intended for it or some other MS with a coverage class 2.

MS3 is in a coverage class requiring four block repeated transmissions can expect the first transmission to occur in any block position that indicates 1 of 4 transmissions (e.g. block E in FIG. 6). In this example, MS3 (requiring 4 repetitions) may sync up and start to monitor blocks 604a with frame numbers E, E+1, E+2 and E+3 and after decoding them to recover the original block will realize these four blocks 604a are for a MS with coverage class 4 and further examine the decoded original block to see if the four blocks 604a are the intended for it or some other MS with a coverage class 4.

MS4 is in a coverage class requiring eight block repeated transmissions can expect the first transmission to occur in any block position that indicates 1 of 8 transmissions (e.g. block with frame number E+4 in FIG. 6). In this example, MS4 (requiring 8 repetitions) may sync up and start to monitor blocks 604b with frame numbers E+5, E+6 . . . E+12 and will not be able to decode them to recover the original block 604b because it did not sync up to monitor blocks 604b with frame numbers E+4, E+5 . . . E+11. This is a drawback of this embodiment since the MS with a specific coverage class N will in effect have to go through a learning process (computational process) by which it determines to sync up and start to monitor a first block in the repetition period that has an indicator that indicates the correct 1 of N. This can require a lot of computational processing by an MS that has a coverage class that is greater than 1. However, if MS2, MS3 or MS4 happens to be in a better coverage than expected then those devices will be able to decode the block after fewer repetitions than the maximum number of repetitions, realize that the radio block is not addressing that device, but also realize that the radio block will be further repeated, and hence, can stop monitoring the channel for the remainder of the repetition period. This is also the case with any of the previous embodiments of the present disclosure.

In all of the foregoing embodiments, the indicator 404, 504, 604a, 604b, 604c and 604d provided in the DL blocks 402, 502, 602a, 602b, 602c and 602d can apply to common control channels, and/or dedicated control and data channels. Although the disclosed techniques primarily address the DL, the disclosed or similar techniques may apply in the UL, where a receiver can stop monitoring a channel if a block is decoded after fewer repetitions than indicated in the UL block.

In an implementation in a Global System for Mobile (GSM) system 100, the indicator 404, 504, 604a, 604b, 604c and 604$d$ may, for example, be provided in an Information Element in the PCH, the Access Grant Channel (AGCH), and/or a field in the Radio Link Control (RLC)/Media Access Control (MAC) header for dedicated control channels or data channels.

It should be appreciated that the disclosed techniques do not preclude that the indicator 404, 504, 604$a$, 604$b$, 604$c$ and 604$d$ can be implemented in alternative ways, for example, the coverage class can be indicated by the use of a specific Cyclic Redundancy Check (CRC) code in the RLC/MAC header, a specific Training Sequence Code, or for example, taking the exclusive-or (XOR) of a bit pattern specific to a coverage class with one or both of the CRC bits of a block and the data portion of the block.

Figure 7:
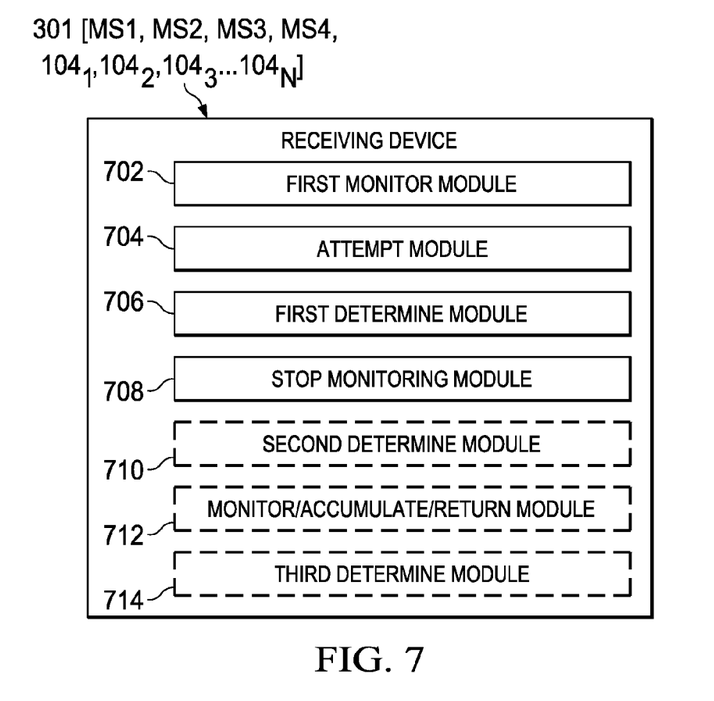
FIG. 7 is a block diagram illustrating structures of an exemplary receiving device (e.g., MS1, MS2, MS3, MS4, wireless devices) configured in accordance with an embodiment of the present disclosure.

Referring to FIG. 7, there is a block diagram illustrating structures of an exemplary receiving device 301 (e.g., MS1, MS2, MS3, MS4, wireless devices 104$_1$, 104$_2$, 104$_3$ . . . 104$_n$) configured in accordance with an embodiment of the present disclosure. In an embodiment, the receiving device 301 may comprise a first monitor module 702, an attempt module 704, a first determine module 706, a stop monitoring module 708, a second determine module 710, a monitor/accumulate/return module 712, and a third determine module 714. The first monitor module 702 is configured to monitor up to N radio blocks 402, 502, 602$a$, 602$b$, 602$c$ and 602$d$ received from the transmitting device 801 (e.g., wireless access nodes 102$_1$ and 102$_2$), wherein N is based on a coverage class of the receiving device 301. The attempt module 704 is configured to attempt to decode an original radio block 402, 502, 602$a$, 602$b$, 602$c$ and 602$d$ by combining the monitored radio blocks 402, 502, 602$a$, 602$b$, 602$c$ and 602$d$. The first determine module 706 is configured to determine if the original radio block 402, 502, 602$a$, 602$b$, 602$c$ and 602$d$ is successfully decoded. In the case where the original radio block 402, 502, 602$a$, 602$b$, 602$c$ and 602$d$ is successfully decoded, the stop monitoring module 708 is configured to stop monitoring a remainder of the radio blocks 402, 502, 602$a$, 602$b$, 602$c$ and 602$d$ in a repetition period, wherein the repetition period comprises a set of radio blocks 402, 502, 602$a$, 602$b$, 602$c$ and 602$d$ where each radio block corresponds to the original radio block, and wherein the repetition period is indicated by an indicator 404, 504, 604$a$, 604$b$, 604$c$ and 604$d$ in each of the monitored radio blocks 402, 502, 602$a$, 602$b$, 602$c$ and 602$d$. In the case where the original radio block 402, 502, 602$a$, 602$b$, 602$c$ and 602$d$ is not successfully decoded, the second determine module 710 is configured to determine if all of the N radio blocks 402, 502, 602$a$, 602$b$, 602$c$ and 602$d$ have been monitored. In the case where all of the N radio blocks 402, 502, 602$a$, 602$b$, 602$c$ and 602$d$ have not been monitored, the monitor/accumulate/return module 712 is configured to monitor a next radio block 402, 502, 602$a$, 602$b$, 602$c$ and 602$d$ received from the transmitting device 801, accumulate the monitored next radio block 402, 502, 602$a$, 602$b$, 602$c$ and 602$d$ with the previously monitored radio blocks 402, 502, 602$a$, 602$b$, 602$c$ and 602$d$, and provide the results to the attempt module 704. In the case where all of the N radio blocks 402 have been monitored, the third determine module 714 is configured to determine that the original radio block 402, 502, 602$a$, 602$b$, 602$c$ and 602$d$ is not decodable.

As those skilled in the art will appreciate, the above-described modules 702, 704, 706, 708, 710, 712, and 714 of the receiving device 301 may be implemented separately as suitable dedicated circuits. Further, the modules 702, 704, 706, 708, 710, 712, and 714 can also be implemented using any number of dedicated circuits through functional combination or separation. In some embodiments, the modules 702, 704, 706, 708, 710, 712, and 714 may be even combined in a single application specific integrated circuit (ASIC). As an alternative software-based implementation, the receiving device 301 may comprise a memory 120$_k$, 120$_2$, 120$_3$ . . . 120$n$, a processor 118$_1$, 118$_2$, 118$_3$ . . . 118$_n$ (including but not limited to a microprocessor, a microcontroller or a Digital Signal Processor (DSP), etc.) and a transceiver 110$_1$, 110$_2$, 110$_3$ . . . 110$n$. The memory 120$_1$, 120$_2$, 120$_3$ . . . 120$_n$ stores machine-readable program code executable by the processor 118$_1$, 118$_2$, 118$_3$ . . . 118$_n$ to cause the receiving device 301 to perform the steps of the above-described method 300.

Figure 8:
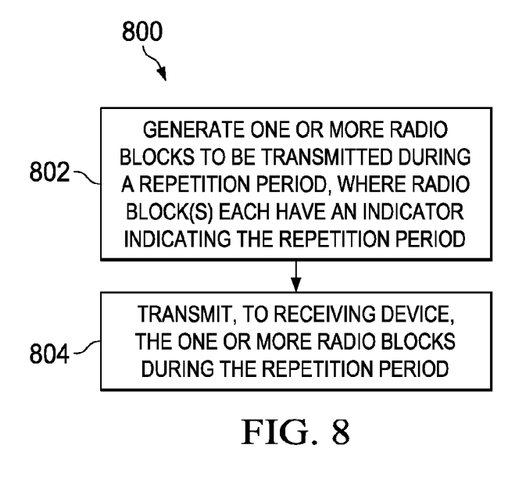
FIG. 8 is a flowchart of a method implemented in a transmitting device (e.g., wireless access nodes) in accordance with an embodiment of the present disclosure.

Referring to FIG. 8, there is a flowchart of a method 800 implemented in a transmitting device 801 (e.g., wireless access nodes 102$_1$ and 102$_2$) in accordance with an embodiment of the present disclosure. At step 802, the transmitting device 801 generates one or more radio blocks 402, 502, 602$a$, 602$b$, 602$c$ and 602$d$ to be transmitted during a repetition period, wherein the repetition period is based on a coverage class of the receiving device, and wherein the one or more radio blocks 402, 502, 602$a$, 602$b$, 602$c$ and 602$d$ each includes an indicator 404, 504, 604$a$, 604$b$, 604$c$ and 604$d$ therein that indicates the repetition period. At step 804, the transmitting device 801 transmits the one or more repeated radio blocks 402, 502, 602$a$, 602$b$, 602$c$ and 602$d$ to the receiving device (e.g., MS1, MS2, MS3, MS4, wireless devices 104$_1$, 104$_2$, 104$_3$ . . . 104$_n$) during the repetition period. There are three examples of implementing the method 800 using different types of indicators 404, 504, 604$a$, 604$b$, 604$c$ and 604$d$ which may be provided implicitly (fixed frame structure) or explicitly (non-fixed frame structure) to the receiving device 301 that have been described above with respect to FIGS. 4-6.

Figure 9:
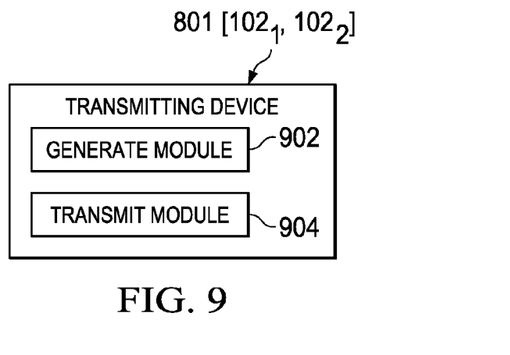
FIG. 9 is a block diagram illustrating structures of an exemplary transmitting device (e.g., wireless access nodes) configured in accordance with an embodiment of the present disclosure.

Referring to FIG. 9, there is a block diagram illustrating structures of an exemplary transmitting device 801 (e.g., wireless access nodes 102$_1$ and 102$_2$) configured in accordance with an embodiment of the present disclosure. In an embodiment, the transmitting device 801 may comprise a generating module 902 and a transmitting module 904. The generating module 902 is configured to generate one or more radio blocks 402, 502, 602$a$, 602$b$, 602$c$ and 602$d$ to be transmitted during a repetition period, wherein the repetition period is based on a coverage class of the receiving device, and wherein the one or more radio blocks 402, 502, 602$a$, 602$b$, 602$c$ and 602$d$ each includes an indicator 404, 504, 604$a$, 604$b$, 604$c$ and 604$d$ therein that indicates the repetition period. The transmitting module 904 is configured to transmit the one or more radio blocks 402, 502, 602$a$, 602$b$, 602$c$ and 602$d$ to the receiving device (e.g., MS1, MS2, MS3, MS4, wireless devices 104$_1$, 104$_2$, 104$_3$ . . . 104$_n$) during the repetition period.

As those skilled in the art will appreciate, the above-described modules 902 and 904 of the transmitting device 801 may be implemented separately as suitable dedicated circuits. Further, the modules 902 and 904 can also be implemented using any number of dedicated circuits through functional combination or separation. In some embodiments, the modules 902 and 904 may be even combined in a single application specific integrated circuit (ASIC). As an alternative software-based implementation, the receiving device 301 may comprise a memory 134$_1$ and 134$_2$, a processor 132$_1$ and 132$_2$ (including but not limited to a microprocessor, a microcontroller or a Digital Signal Processor (DSP), etc.) and a transceiver 128$_1$ and 128$_2$. The memory 134$_1$ and 134$_2$ stores machine-readable program code executable by the processor 132₁ and 132₂ to cause the transmitting device 801 to perform the steps of the above-described method 800.

In view of the foregoing disclosure, it should be appreciated that the present disclosure describes where a transmitting device 801 includes an indicator in the DL (or UL) radio block (e.g., for paging, resource assignment, or scheduling data) for indicating the number of repeated transmissions used for the radio block. The receiving device 301 may use this indicator to determine if the receiving device 301 can stop monitoring the channel if the radio block can be decoded prior to the end of the repetition period, wherein the time duration of performing all transmissions may be indicated in the radio block. The receiving device 301 by stopping the monitoring before the end of the repetition period allows the receiving device 301 to realize a power savings (e.g., battery power savings).

It should also be appreciated that the term "coverage class" used herein can be defined as follows: At any point in time a device belongs to a specific uplink/downlink coverage class which determines the total number of blind transmissions to be used when transmitting/receiving radio blocks. An uplink/downlink coverage class applicable at any point in time can differ between different logical channels. Upon initiating a system access a device determines the uplink/downlink coverage class applicable to the RACH/AGCH based on estimating the number of blind repetitions of a radio block required by the BSS receiver/device receiver to experience a BLER (block error rate) of approximately 10%. The BSS determines the uplink/downlink coverage class to be used by a device on its assigned packet channel resources based on estimating the number of blind repetitions of a radio block required to satisfy a target BLER and considering the number of HARQ retransmissions (of a radio block) that will, on average, result from using that target BLER.

Those skilled in the art will appreciate that the use of the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Of course, the present disclosure may be carried out in other specific ways than those herein set forth without departing from the scope and essential characteristics of the invention. One or more of the specific processes discussed above may be carried out in a cellular phone or other communications transceiver comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

Although multiple embodiments of the present disclosure have been illustrated in the accompanying Drawings and described in the foregoing Detailed Description, it should be understood that the invention is not limited to the disclosed embodiments, but instead is also capable of numerous rearrangements, modifications and substitutions without departing from the present disclosure that as has been set forth and defined within the following claims.

The invention claimed is:

1. A receiving device configured to communicate with a transmitting device, the receiving device comprising:
   a processor; and,
   a memory that stores processor-executable instructions, wherein the processor interfaces with the memory to execute the processor-executable instructions, whereby the receiving device is operable to:
   monitor up to N radio blocks received from the transmitting device, wherein N is based on a coverage class of the receiving device;
   attempt to decode an original radio block by combining the monitored radio blocks;
   determine whether the original radio block was successfully decoded; and,
   based on the determination that the original radio block was successfully decoded, stop monitoring a remainder of radio blocks in a repetition period, wherein the repetition period comprises a set of radio blocks each of which corresponds to the original radio block, wherein the repetition period is indicated by an indicator in each of the monitored radio blocks, and wherein a number of the N radio blocks is not equal to a number of the radio blocks in the repetition period.

2. The receiving device of claim 1, wherein the receiving device is further operable to:
   based on the determination that the original radio block was not successfully decoded, determine whether all of the N radio blocks have been monitored;
   based on the determination that all of the N radio blocks have not been monitored, monitor a next radio block received from the transmitting device, accumulate the monitored next radio block with the previously monitored radio blocks, and return to the operation to attempt to decode; and,
   based on the determination that all of the N radio blocks have been monitored, determine that the original radio block is not decodable.

3. The receiving device of claim 1, wherein each monitored radio block in the repetition period is received based on a fixed frame structure and includes the indicator, which indicates a number of radio block repetitions in the repetition period.

4. The receiving device of claim 1, wherein each monitored radio block in the repetition period is received based on a fixed frame structure and includes the indicator, which indicates a number of radio block repetitions in the repetition period, and wherein a first radio block in the repetition period is only allowed to be present at a specific frame number (N*M)+1, where M is an integer 0.

5. The receiving device of claim 1, wherein each monitored radio block in the repetition period is received based on a non-fixed frame structure and includes the indicator, which indicates a number of radio block repetitions in the repetition period and further indicates a number of radio block repetitions remaining in the repetition period.

6. A method in a receiving device configured to communicate with a transmitting device, the method comprising:
monitoring up to N radio blocks received from the transmitting device, wherein N is based on a coverage class of the receiving device;
attempting to decode an original radio block by combining the monitored radio blocks;
determining whether the original radio block was successfully decoded; and,
based on the determination that the original radio block was successfully decoded, stopping monitoring a remainder of radio blocks in a repetition period, wherein the repetition period comprises a set of radio blocks each of which corresponds to the original radio block, wherein the repetition period is indicated by an indicator in each of the monitored radio blocks, and wherein a number of the N radio blocks is not equal to a number of the radio blocks in the repetition period.

7. The method of claim 6, further comprising:
based on the determination that the original radio block was not successfully decoded, determining whether all of the N radio blocks have been monitored;
based on the determination that all of the N radio blocks have not been monitored, monitoring a next radio block received from the transmitting device, accumulating the monitored next radio block with the previously monitored radio blocks, and returning to the step of attempting to decode; and,
based on the determination that all of the N radio blocks have been monitored, determining that the original radio block is not decodable.

8. The method of claim 6, wherein each monitored radio block in the repetition period is received based on a fixed frame structure and includes the indicator, which indicates a number of radio block repetitions in the repetition period.

9. The method of claim 6, wherein each monitored radio block in the repetition period is received based on a fixed frame structure and includes the indicator, which indicates a number of radio block repetitions in the repetition period, and wherein a first radio block in the repetition period is only allowed to be present at a specific frame number (N*M)+1, where M is an integer 0.

10. The method of claim 6, wherein each monitored radio block in the repetition period is received based on a non-fixed frame structure and includes the indicator, which indicates a number of radio block repetitions in the repetition period and further indicates a number of radio block repetitions remaining in the repetition period.

11. A transmitting device configured to communicate with a receiving device that is configured to monitor up to N radio blocks received from the transmitting device, wherein N is based on a coverage class of the receiving device, the transmitting device comprising:
a radio transmitter; and
a processing circuit for controlling operation of the transmitting device, the processing circuit including a processor coupled to a memory that stores processor-executable instructions, wherein when the processor interfaces with the memory to execute the processor-executable instructions, the processor causes the transmitting device to:
generate one or more repeated radio blocks to be transmitted during a repetition period, wherein the one or more repeated radio blocks each includes an indicator that indicates the repetition period, and wherein a number of the N radio blocks is not equal to a number of the repeated radio blocks in the repetition period; and,
use the radio transmitter to transmit, to the receiving device, the one or more repeated radio blocks during the repetition period.

12. The transmitting device of claim 11, wherein the radio transmitter is configured to transmit each radio block in the repetition period based on a fixed frame structure, wherein each radio block includes the indicator, which indicates a number of radio block repetitions in the repetition period.

13. The transmitting device of claim 11, wherein the radio transmitter is configured to transmit each radio block in the repetition period based on a fixed frame structure, wherein each radio block includes the indicator, which indicates a number of radio block repetitions in the repetition period, and wherein a first radio block in the repetition period is only allowed to be present at a specific frame number (N*M)+1, where M is an integer 0.

14. The transmitting device of claim 11, wherein the radio transmitter is configured to transmit each radio block in the repetition period based on a non-fixed frame structure, wherein each radio block includes the indicator, which indicates a number of radio block repetitions in the repetition period and further indicates a number of radio block repetitions remaining in the repetition period.

15. A method in a transmitting device configured to communicate with a receiving device that is configured to monitor up to N radio blocks received from the transmitting device, wherein N is based on a coverage class of the receiving device, the method comprising:
generating, by a processing circuit configured to control operation of the transmitting device, one or more repeated radio blocks to be transmitted during a repetition period, wherein the one or more repeated radio blocks each includes an indicator that indicates the repetition period, and wherein a number of the N radio blocks is not equal to a number of the repeated radio blocks in the repetition period; and,
transmitting, to the receiving device by a radio transmitter in the transmitting device, the one or more repeated radio blocks during the repetition period.

16. The method of claim 15, wherein the transmitting step includes transmitting by the radio transmitter, each radio block in the repetition period based on a fixed frame structure, wherein each radio block includes the indicator, which indicates a number of radio block repetitions in the repetition period.

17. The method of claim 15, wherein the transmitting step includes transmitting by the radio transmitter, each radio block in the repetition period based on a fixed frame structure, wherein each radio block includes the indicator, which indicates a number of radio block repetitions in the repetition period, and wherein a first radio block in the repetition period is only allowed to be present at a specific frame number (N*M)+1, where M is an integer 0.

18. The method of claim 15, wherein the transmitting step includes transmitting by the radio transmitter, each radio block in the repetition period based on a non-fixed frame structure, wherein each radio block includes the indicator, which indicates a number of radio block repetitions in the repetition period and further indicates a number of radio block repetitions remaining in the repetition period.

* * * * *

UNITED STATES PATENT AND TRADEMARK OFFICE
CERTIFICATE OF CORRECTION

PATENT NO. : 9,769,748 B2
APPLICATION NO. : 14/749001
DATED : September 19, 2017
INVENTOR(S) : Schliwa-Bertling et al.

It is certified that error appears in the above-identified patent and that said Letters Patent is hereby corrected as shown below:

In the Specification

In Column 8, Line 22, delete "M3, M4," and insert -- MS3, MS4, --, therefor.

In Column 11, Lines 30-31, delete "transmitting device $102_2$)," and insert -- transmitting device 801), --, therefor.

In Column 14, Line 66, delete "Mobile" and insert -- Mobile Communication --, therefor.

In Column 16, Line 5, delete "$120_k$," and insert -- $120_1$, --, therefor.

In Column 16, Line 6, delete "120n," and insert -- $120_n$, --, therefor.

In Column 16, Line 9, delete "110n." and insert -- $110_n$. --, therefor.

In Column 16, Line 66, delete "$128_1$ and $128_2$." and insert -- $122_1$ and $122_2$. --, therefor.

In the Claims

In Column 18, Line 63, in Claim 4, delete "integer 0." and insert -- integer $\geq 0$. --, therefor.

In Column 19, Line 44, in Claim 9, delete "integer 0." and insert -- integer $\geq 0$. --, therefor.

In Column 20, Line 21, in Claim 13, delete "integer 0." and insert -- integer $\geq 0$. --, therefor.

In Column 20, Line 58, in Claim 17, delete "integer 0." and insert -- integer $\geq 0$. --, therefor.

Signed and Sealed this
First Day of September, 2020

Andrei Iancu
*Director of the United States Patent and Trademark Office*